(12) United States Patent
Rehurek

(10) Patent No.: US 10,346,494 B2
(45) Date of Patent: Jul. 9, 2019

(54) SEARCH ENGINE SYSTEM COMMUNICATING WITH A FULL TEXT SEARCH ENGINE TO RETRIEVE MOST SIMILAR DOCUMENTS

(71) Applicant: Radim Rehurek, Prague (CZ)

(72) Inventor: Radim Rehurek, Prague (CZ)

( * ) Notice: Subject to any disclaimer, the term of this patent is extended or adjusted under 35 U.S.C. 154(b) by 0 days.

(21) Appl. No.: 15/726,803

(22) Filed: Oct. 6, 2017

(65) Prior Publication Data

US 2018/0300415 A1 Oct. 18, 2018

Related U.S. Application Data

(60) Provisional application No. 62/485,954, filed on Apr. 16, 2017.

(51) Int. Cl.
*G06F 17/30* (2006.01)
*G06F 16/9535* (2019.01)
*G06F 16/93* (2019.01)
*G06F 16/22* (2019.01)

(52) U.S. Cl.
CPC ...... *G06F 16/9535* (2019.01); *G06F 16/2237* (2019.01); *G06F 16/93* (2019.01)

(58) Field of Classification Search
CPC ......... G06F 17/30011; G06F 17/30324; G06F 17/30867

USPC .......................................................... 707/711
See application file for complete search history.

(56) References Cited

U.S. PATENT DOCUMENTS

| 8,473,510 B1 * | 6/2013 | Tong ................. G06F 17/30666 707/769 |
| 2016/0070731 A1 * | 3/2016 | Chang .................... G06Q 30/00 707/741 |

* cited by examiner

*Primary Examiner* — Sheree N Brown

(57) ABSTRACT

Disclosed is a computerized search engine system includes a memory unit to store documents and plurality of modules, and a processor coupled to the memory unit. The processor executes the plurality of modules. The plurality of modules includes an indexing module and a query module coupled to the indexing module. The indexing module initiates with a step to create a vector for each document, encode the vector into fake words, and the final step is to index fake words corresponding to each document into the full text search engine. The query module initiates with a step to receive a search query related to a query document. The step is then followed by a step to create a query document vector for the received query document, encode the query document vector representing the query document into fake query words, and concluding with the step to search full text search engine using the fake query words to match with the indexed fake words to retrieve most similar documents to the query document from the index.

6 Claims, 3 Drawing Sheets

SEARCH ENGINE SYSTEM COMMUNICATING WITH A FULL TEXT SEARCH ENGINE TO RETRIEVE MOST SIMILAR DOCUMENTS

CROSS REFERENCE TO RELATED APPLICATION

This application claims priority to U.S. Provisional Application No. 62/485,954 filed on Apr. 16, 2017, the entireties of which are incorporated herein by reference.

BACKGROUND OF THE INVENTION

1. Field of the Invention

The present invention generally relates to a search engine system communicating with a full text search engine; and more particularly relates to a search engine system communicating with a full text search engine to retrieve most similar documents in response to a query document, using vectors to represent documents.

2. Description of Related Art

Fundamentally, computers are tools for helping people with their everyday activities. Processors may be considered as extensions to our reasoning capabilities and storage devices may be considered as extensions to our memories.

Search engines (e.g. internet search engines) allow a user to identify relevant documents, in response to a query comprising e.g. one or more search terms or documents. Search engines typically make use of significant computing resources (with regards to processing power and with regards to memory), in order to provide the user with a reliable list of potentially relevant documents.

Various electronic devices (e.g. smartphones, computers, laptops, tablet computers, notebook computers, etc.) allow a user to carry around a large database of text documents (such as electronic books, CV, marketing reports, internal business documents, emails, sms, calendar database entries, address book entries, downloaded webpages, and others). The user should be enabled to reliably and efficiently determine relevant text documents from the database of text documents, in response to a query.

There are existing ways of storing, searching and retrieving text documents based on different techniques such as: full text keyword search, full text index, inverted index, semantic search, semantic vector analysis, vector index and vector search etc.

The vector space model of representing documents in high-dimensional vector spaces has been validated by decades of research and development. Extensive deployment of inverted-index-based information retrieval (IR) systems has led to the availability of robust open source IR systems such as Sphinx, Lucene or its popular, horizontally scalable extensions of Elasticsearch and Solr.

A database index is a data structure that improves the speed of data retrieval operations on a database table at the cost of additional writes and storage space to maintain the index data structure. Indexes are used to quickly locate data without having to search every row in a database table every time a database table is accessed. Indexes can be created using one or more columns of a database table, providing the basis for both rapid random lookups and efficient access of ordered records.

Generally, inverted index is a type of database index used to optimize the search of indexed documents from the inputted search keywords query. The inverted index (also referred to as postings file or inverted file) is an index data structure storing a mapping from content, such as words or numbers, to its locations in a database file, or in a document or a set of documents.

Today, systems based on distributional semantics and deep learning allow the construction of semantic vector space models representing words, sentences, paragraphs or even whole documents as vectors in high-dimensional spaces with accuracy superior to keyword search.

Vectors are superior representation of documents. To allow searching through the documents represented as vectors, there is a need of a vector search engine. To implement, configure, maintain a vector search engine is a costly, tedious and complex task. On the other hand full text search engine are not costly, not tedious and not complex to use. Therefore, there is a need of a search engine system for performing semantic vector search for an input query document using a full text search engine to retrieve most similar documents.

SUMMARY OF THE INVENTION

In accordance with teachings of the present invention, a computerized search engine system communicating with a full text search engine to retrieve most similar documents in response to a query document search inputted by a user is provided.

An object of the present invention is to provide a computerized search engine system that includes a memory unit to store documents and plurality of modules, and a processor coupled to the memory unit. The processor executes the plurality of modules. The plurality of modules includes an indexing module and a query module coupled to the indexing module.

The indexing module initiates with a step to create a vector for each document, encode the vector into fake words, and the final step is to index fake words corresponding to each document into the full text search engine. The query module initiates with a step to receive a search query related to a query document. The vectors are n-dimensional having numerical features representing the same document.

The step is then followed by a step to create a query document vector for the received query document, encode the query document vector representing the query document into fake query words, and concluding with the step to search full text search engine using the fake query words to match with the indexed fake words to retrieve most similar documents to the query document from the index.

Another object of the present invention is to provide the system wherein the search query is performed by running of a script. The script may be executed either by search by document, search by vector corresponding to the query document, or search by encoded fake words corresponding to the query document.

Another object of the present invention is to provide a computerized search engine system that includes a re-ranking module coupled to the query module to re-shuffle the retrieved documents according to a desired metric, and a filtering module for reducing the size of the query document vector by allowing the user to select important numerical features.

These and other features of the present invention will become readily apparent upon further review of the following specification and drawings.

DETAILED DESCRIPTION OF THE DRAWINGS

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
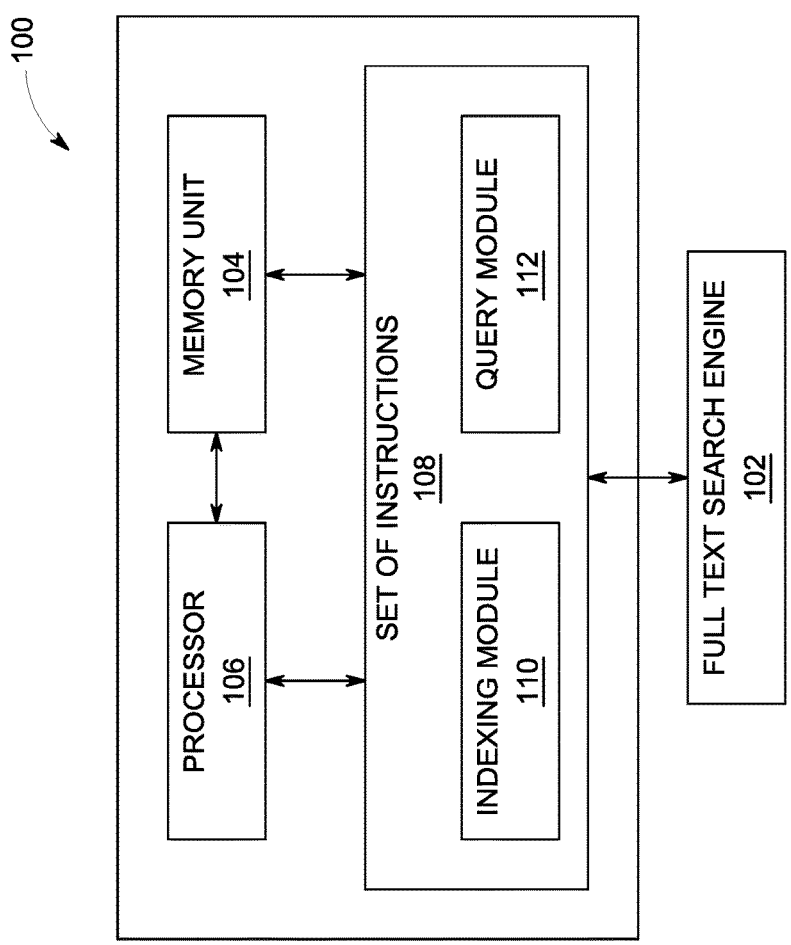
FIG. 1 illustrates a block diagram of a computerized search engine system communicates with a full text search engine to retrieve most similar documents in response to a query document search inputted by a user.

FIG. 1 illustrates a block diagram of a computerized search engine system 100 communicates with a full text search engine 102 to retrieve most similar documents in response to a query document search inputted by a user. The computerized search engine system 100 includes a memory unit 104 and a processor 106.

The memory unit 104 stores documents and plurality of modules 108. The plurality of modules 108 includes an indexing module 110 and a query module 112. The indexing module 110 improves the speed of data retrieval operations from the full text engine. The indexing module 110 is explained in detail in conjunction with FIG. 2 of the present invention.

The query module 112 is coupled to the indexing module 110. The query module 112 takes the input query into the indexed full text search engine to retrieve most similar documents. The query module 112 is explained in detail in conjunction with FIG. 3 of the present invention.

Figure 2:
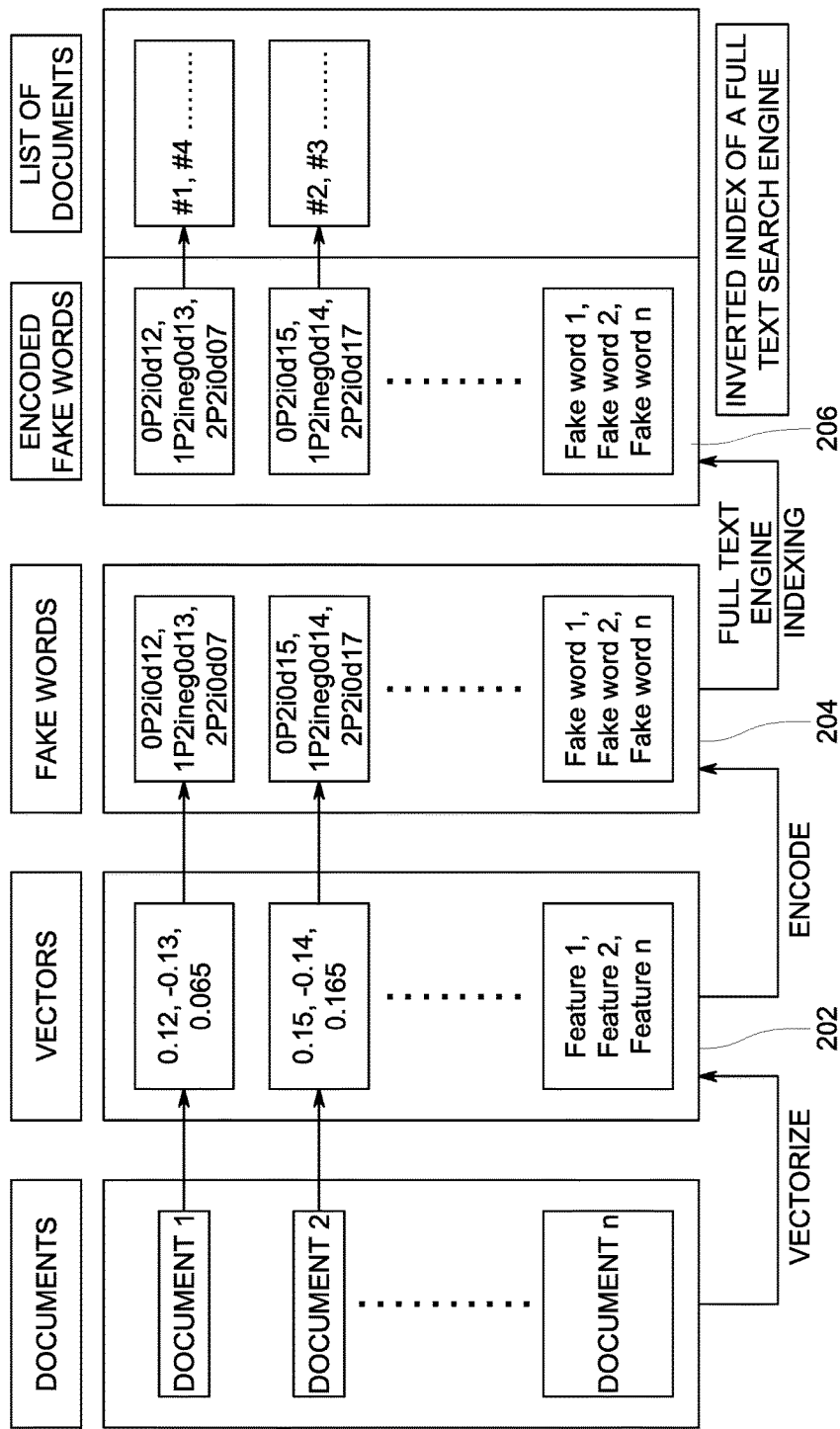
FIG. 2 illustrates a flow diagram of an indexing module in accordance with an exemplary embodiment of the present invention.

FIG. 2 illustrates a flow diagram of the indexing module 110 in accordance with an exemplary embodiment of the present invention. The indexing module 110 initiates with a step 202 to create a vector for each document. In exemplary embodiment, the document may be either uploaded locally from the memory unit or may be sent to a central server via a communication network.

The vectors are n-dimensional having numerical features representing a document. In another preferred embodiment of the present invention, each document may be spot into multiple parts, wherein each part is further converted into one vector. Types of the document include but are not limited to text documents, image documents, PDFs, multimedia files etc.

Examples of a vector include but are not limited to 1, 0.09, −0.5 for document 1, and 2, −0.009, 0.12 for document 2. It would be apparent to those skilled in the art that various types of vectors to create documents may be envisioned without deviating from the scope of the present invention.

The step 202 is then followed by a step 204 to encode the vector into fake words. The fake words may contain numeric and special characters, alphabetic letters etc. In a preferred embodiment of the present invention, the fake words are created using a rounding method, a interval method, a combined method etc.

The rounding method rounds each vector feature to a fixed number of decimal positions and encodes the vector feature as a fake word. As shown in FIG. 2 of the present invention, example of the rounding method on vector [0.12, −0.13, 0.065] produces fake words '0P2i0d12', '1 P2ineg0d13', '2P2i0d07'. Similarly, example of the rounding method on vector [0.15, −0.14, 0.165] produces fake words '0P2i0d15', '1P2ineg0d14', '2P2i0d17'.

The interval method quantizes a vector into intervals of fixed length. Combined with the interval length denotation of I10, the full vector is encoded into the fake words. The combined method combines rounding and interval encoding together to produce fake words.

It would be readily apparent to those skilled in the art that various methods such as interval and combined may be used to create fake words without deviating from the scope of the present invention.

The step 204 is then followed by a step 206 to index fake words corresponding to each encoded document into the full text search engine. The encoded documents are consequently indexed in a traditional full text search engine. The indexing allows searching of related documents in the full text search engine. In a preferred embodiment of the present invention, the full text engine is indexed via inverted index.

However, it would be readily apparent to those skilled in the art that various types of index may be envisioned such as forward index, Ngram index, Suffix tree index, citation index, document-term index etc without deviating from the scope of the present invention.

Figure 3:
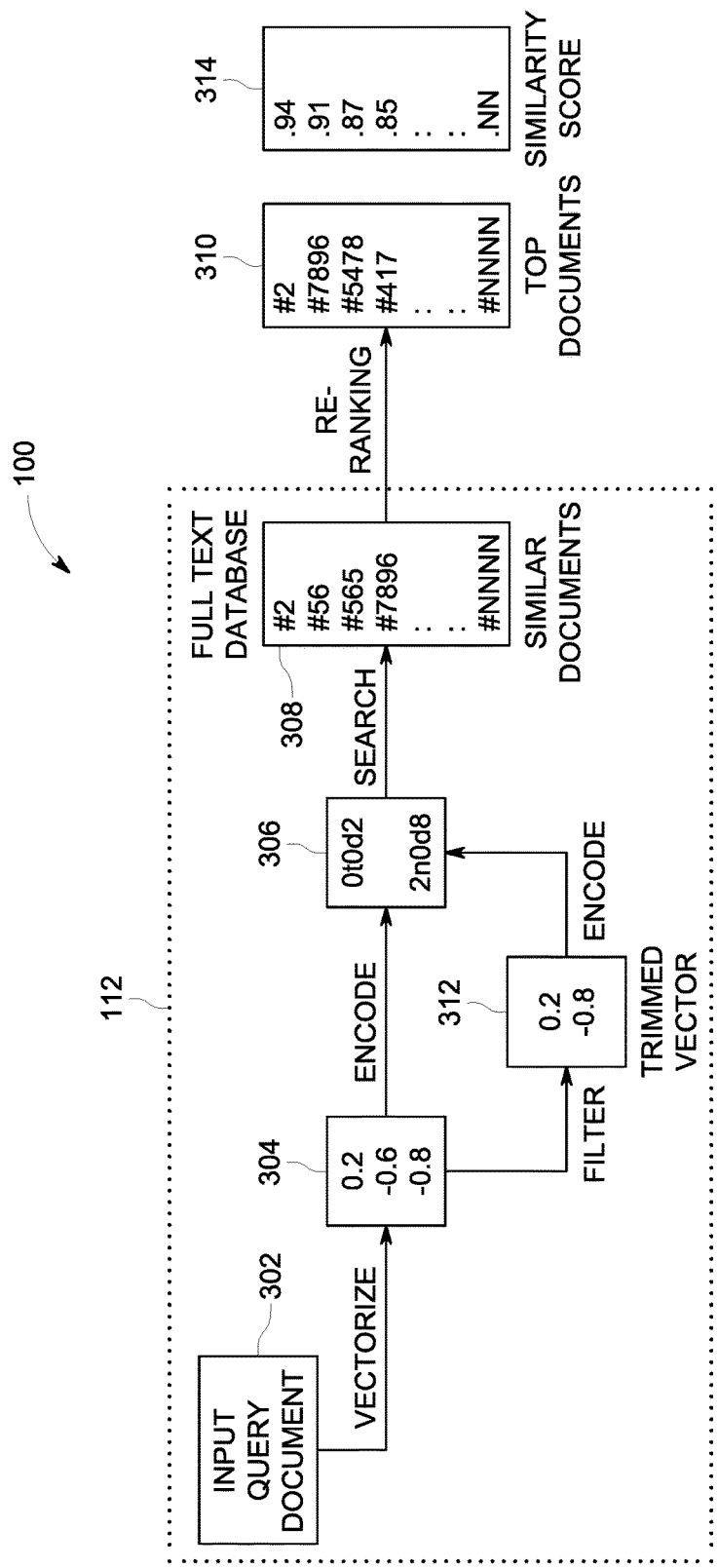
FIG. 3 illustrates a flow diagram of the query module in accordance with an exemplary embodiment of the present invention.

FIG. 3 illustrates a flow diagram of the query module 112 in accordance with an exemplary embodiment of the present invention. The query module 112 initiates with a step 302 to receive a search query related to a query document. The search query may be inputted by either search by document or search by a vector corresponding to the query document, or search by fake words corresponding to the query document.

The step 302 is then followed by a step 304 for creating a query document vector for the received query document. In an exemplary embodiment of the present invention, the vector is 2, −0.06, −0.8 for the input query document. The uniqueness of the present invention is in encoding vectors into fake words.

The step 304 is then followed by a step 306 of encoding the query document vector representing the query document into fake query words. The process of creating a vector as explained in step 304 and the step 306 are explained in detail in conjunction with step 202 and the step 204 of FIG. 2 of the present invention.

In an exemplary embodiment of the present invention as shown in FIG. 3, the query document vector 304 '2, −0.06, −0.8' is encoded to fake query words 306 '0t0d2, 2n0d6 (not shown in FIG. 3, as being filtered out), 2n0d8'. It would be readily apparent to those skilled in the art that various types of query document vector 304 and encoded fake words 306 may be envisioned without deviating from the scope of the present invention.

The step 306 is then followed by a step 308 of searching full text search engine using the fake query words to match with the indexed fake words to retrieve most similar documents to the query document from the index. In an exemplary embodiment of the present invention, the identified documents to the encoded fake words 0t0d2, 2n0d8 are the documents #2, #56, #565, #7896 . . . #NNNN. The #NNNN here denotes the last document in the list of retrieved most similar documents.

In another exemplary embodiment of the present invention, each document is represented as a vector of 'n' features computed by Latent Semantic Analysis (LSA) calculated over term frequency-inverse document frequency (TF-IDF). Further the present invention stores one token per dimension for each vector.

In another preferred embodiment of the present invention, the computerized search engine system 100 includes a re-ranking module 310 coupled to the query module to reorder the retrieved documents according to a desired metric. The re-ranking module 310 allows the user to re-rank the retrieved documents using a more computationally expensive but more accurate metric.

Examples of the desired metrics include but are not limited to cosine similarity, Hellinger distance, Kullback-Leibler divergence, Jensen-Shannon similarity. For exemplary purposes, the top 100 results from the fulltext engine are re-ranked according to cosine similarity, and only the top 10 final results along with their similarity scores returned as the result of the query. It would be readily apparent to those skilled in the art that various types of desired metrics may be used to re-rank the results retrieved from the full text search engine.

The re-ranking module 310 arranges the documents retrieved from the full-text search engine into the desired order. As shown in FIG. 3 for exemplary purposes, the re-ranked order of the retrieved documents is #2, #7896, #5478, #417 . . . #NNNN. #NNNN denotes the last document of the retrieved most similar documents.

In another preferred embodiment of the present invention, the system 100 further includes a filtering module 312 for reducing the size of the query document vector by allowing the user to select the important numerical features. In exemplary embodiment as shown in FIG. 3 of the present invention, the query vector 2, 0.06, −0.7 is filtered to 2, −0.7.

In a preferred embodiment of the present invention, the features of each vector are ordered according to their absolute value and only a fixed number of the highest-valued features are added to the index, discarding the rest. It would be readily apparent to those skilled in the art that various methods such as the threshold method (where feature tokens in the query with an absolute value of the feature below a threshold are discarded from the query) may be used to filter the size of the query document vector without deviating from the scope of the present invention.

In another preferred embodiment of the present invention, the system 100 further includes a similarity module 314 to show a similarity level between the retrieved document and the query document. For exemplary purposes as shown in FIG. 3, the document #2 has 0.94 similarity to the input document query, document #7896 has 0.91 similarity, and document #5478 has 0.87 similarity.

The present invention offers various advantages such as conversion of semantic vectors into a set of string 'fake words' that are subsequently indexed in a standard inverted-index-based fulltext search engine. The present invention significantly speeds up the search process, with an acceptably low impact on the quality of the results.

Further, the present invention is faster than MoreLikeThis (MLT). With moderate query vector feature reduction, the present invention achieves excellent approximation of the gold standard while being only marginally slower than MLT.

The above described embodiments should be regarded as illustrative rather than restrictive. Accordingly, it should be appreciated that variations to those embodiments may be made by those skilled in the art without departing from the scope of the invention as defined by the following claims.

The invention claimed is:

1. A computerized search engine system communicates with a full text search engine to retrieve most similar documents in response to a query document search inputted by a user, the computerized search engine system comprising:
   a memory unit to store documents and plurality of modules; and
   a processor coupled to the memory unit, the processor executing the plurality of modules, wherein the plurality of modules comprising:
      indexing module for:
         vectorizing automatically by the processor by creating a vector for each document stored in the memory unit, wherein the vector is a sequence of numeric components;
         encoding automatically by the processor by creating a fake word for each numeric component of the vector, wherein the fake word is a sequence of one or more alphanumeric and special characters; and
         indexing fake words corresponding to each document by a full text search engine automatically by the processor;
      query module coupled to the indexing module for:
         receiving a search query related to a query document;
         vectorizing automatically by the processor by creating a query document vector for the received query document, wherein the vector is a sequence of numeric components;
         encoding automatically by the processor by creating a fake query word for each numeric component of the query document vector, wherein the fake word is a sequence of one or more alphanumeric and special characters,
         searching full text search engine using the fake query words matching the indexed fake words with the fake query words to retrieve most similar documents to the query document from the full text search engine automatically by the processor
         searching a full text search engine with the fake query words to retrieve from the memory unit the most similar documents to the query document; and
         transmitting the retrieved most similar documents to the memory unit.

2. The system according to claim 1 wherein the query document is inputted by at least one of: search by document; search by vector corresponding to the query document; and search by fake words corresponding to the query document.

3. The system according to claim 1 further comprising a re-ranking module coupled to the query module to re-shuffle the retrieved documents according to a metric.

4. The system according to claim 1 wherein the vectors are n-dimensional having numerical components representing the same document.

5. The system according to claim 4 further comprising a filtering module for automatically reducing size of the query document vector by the processor, by allowing the user to select Important numerical components.

6. The system according to claim 1 further comprising a similarity module to show a similarity level corresponding to the similarity between each retrieved most similar document and the query document.

\* \* \* \* \*